(12) United States Patent
Holdener et al.

(10) Patent No.: US 6,381,080 B1
(45) Date of Patent: Apr. 30, 2002

(54) BI-STABLE OPTICAL ELEMENT ACTUATOR DEVICE

(75) Inventors: Fred R. Holdener, Tracy; Robert D. Boyd, Livermore, both of CA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 68 days.

(21) Appl. No.: 09/666,329

(22) Filed: Sep. 21, 2000

Related U.S. Application Data

(63) Continuation-in-part of application No. 09/418,477, filed on Oct. 15, 1999, now Pat. No. 6,144,506.

(51) Int. Cl.$^7$ .................................................. G02B 7/02
(52) U.S. Cl. ........................ 359/812; 359/811; 359/813; 359/814; 359/817; 359/822; 359/827
(58) Field of Search ................................ 359/812, 811, 359/813, 814, 817, 822, 827, 823; 353/76, 101; 350/255

(56) References Cited

U.S. PATENT DOCUMENTS

| 1,967,161 | A |   | 7/1934  | Simon ........................ 353/76 |
| 3,675,559 | A |   | 7/1972  | Freeland ...................... 95/44 |
| 4,146,315 | A |   | 3/1979  | Pribich ....................... 353/76 |
| 5,742,441 | A |   | 4/1998  | Grassens et al. ............ 359/822 |
| 6,220,251 | B1 | * | 4/2001 | Jeong et al. ............... 132/73.5 |
| 6,314,681 | B1 | * | 11/2001 | Moody ........................ 49/343 |

* cited by examiner

*Primary Examiner*—Georgia Epps
*Assistant Examiner*—Tim Thompson
(74) *Attorney, Agent, or Firm*—Randall W. Chang; William C. Daubenspeck; Virginia B. Caress

(57) ABSTRACT

The present invention is a bistable optical element actuator device utilizing a powered means to move an actuation arm, to which an optical element is attached, between two stable positions. A non-powered means holds the actuation arm in either of the two stable positions. The optical element may be a electromagnetic (EM) radiation or particle source, an instrument, or EM radiation or particle transmissive reflective or absorptive elements. A bearing is used to transfer motion and smoothly transition the actuation arm between the two stable positions.

22 Claims, 5 Drawing Sheets

BI-STABLE OPTICAL ELEMENT ACTUATOR DEVICE

CROSS-REFERENCE TO RELATED APPLICATIONS

This application is a continuation-in-part of U.S. application Ser. No. 09/418,477, filed Oct. 15, 1999, now U.S. Pat. No. 6,144,506.

STATEMENT OF GOVERNMENT INTEREST

The United States Government has rights in this invention pursuant to Contract No. W-7405-END-48 between the United States Department of Energy and the University of California for Management of the Lawrence Livermore National Laboratory.

BACKGROUND OF THE INVENTION

The present invention relates generally to optical actuator positioning devices, and particularly to bi-stable optical actuator devices.

1. Description of Related Art

It is known in the art of bi-stable optical actuator devices to move an optical clement into and out of the path of a beam of electromagnetic radiation or particles, or to position a source such as a laser with respect to a target. However, two-state devices that switch a component from a first stationary position to a second stationary position typically leave the power on while the component is stationed at one of the positions, or may depower one position and retain power in the second position. This overuse of power can cause unnecessary heat and wear to components as well as cause thermal air disturbances to the light beam transmitted. In addition, there is a need for a device wherein at the end of the optical clement's travel there is a minimum of vibration experienced by the optical element.

SUMMARY OF THE INVENTION

It is therefore an object of the present invention to provide a bi-stable optical device that does not require power to maintain the device in either of two stable positions, and wherein the direction of motion of the optical element is reversible between either of the two stable positions.

It is a further object of the present invention to provide a bi-stable optical actuator device that imparts a minimum amount of vibration to an optical element when the optical element is moved from one stable position to a second stable position.

It is a further object of the present invention to provide a bi-stable optical actuator device that can handle a variety of optical elements, including EM radiation or particle sources, EM radiation or particle instruments, elements capable of reflecting, absorbing or transmitting EM radiation or particles, and targets or workpieces upon which the EM radiation or particles will act.

According to one aspect of the present invention, there is provided a bi-stable optical actuator device, comprising a mounting base; an actuation arm having first and second positions and having a first end, a second end, and a middle region, said middle region being rotatably connected to said mounting base, said First end including an elongated opening, said second end having an attached optical element; a driver bar having first and second positions for driving said actuation aim between actuation arm First and second positions, said driver bar having a first end rotatably connected to said mounting base and a second end on which is mounted a bearing for engaging and traveling within said elongated opening, so that when said driver bar pivots in a given direction said actuation arm is driven in an opposite rotational direction by said bearing; a non-powered means for restraining said driver bar in either of its first and second positions which maintains said actuation arm in either of its first and second positions (and thus the optical element in either of its first and second positions); and powered means for driving said driver bar from its first to its second position, so that said actuation arm is driven from its first to its second position, and the optical element is moved from its first to its second position. The optical element may be a source, an instrument, an clement capable of reflecting, transmitting or absorbing EM radiation or particles, or a target or workpiece upon which EM radiation or particles impinge.

According to another aspect of the present invention, the optical element interacts with the flux from a source (preferably a beam source) emitting EM radiation or particles. In one aspect, the optical element receives none of the emission while it is initially held outside of the path of the flux by the non-powered means. The optical element is subsequently moved into the path of the flux when the driver bar is driven by the powered means to its second position and thus the optical element receives at least a portion of said source emission. In another aspect, the optical element initially receives at least a portion of said emission while it is held in the path of the flux by the non-powered means. The optical element is subsequently moved out of the flux when the driver bar is driven by the powered means to its second position.

In a further aspect of the present invention, the optical element is a source (preferably a beam source) emitting EM radiation or particles, wherein at least a portion of said emission initially impinges upon a second optical clement. As the driver bar is driven by the powered means, the second optical element receives no emission from the source. In another aspect, the second optical element initially receives no emission from the source, and subsequently receives at least a portion of said emission when the driver bar is driven by the powered means to its second position.

Other objects and features of the present invention will be apparent from the following detailed description of the present invention.

BRIEF DESCRIPTION OF THE DRAWINGS

In FIG. 4A, the optical clement is initially not in the path of the emitted flux while the driver bar is held in the first position by a non-powered means, and in FIG. 4B, the optical element intercepts at least a portion of the emitted flux when the driver bar is moved to its second position by a powered means.

In FIG. 5A at least a portion of the emitted flux impinges upon a second optical element while the driver bar is in its first position, and in FIG. 5B, the EM radiation or particles no longer impinge on the second optical element when the driver bar is moved to its second position by a powered means.

DETAILED DESCRIPTION OF THE INVENTION

Definitions beam source—a source emitting a beam of particles or electromagnetic (EM) radiation directed in a particular direction.

EM radiation—electromagnetic radiation first position—initial stable position of the driver bar, actuation arm or optical element prior to the driver bar being driven by the powered means instrument—an instrument capable of measuring, sensing or detecting FM radiation or particles non—powered means—means to apply a restraining force to the driver bar by which the driver bar is held in either of its first or second positions without power.

opposite rotational direction—simultaneous motion by the driver bar and the actuation arm, such that the end of the driver bar including the bearing and the end of the actuation arm including the elongated slot pivot along opposing arcs.

optical element—a) a source emitting EM radiation or particles; b) an instrument to measure or detect EM radiation or particles; c) an clement capable of reflecting, transmitting or absorbing EM radiation or particles. Examples of such elements include but are not limited to shields, mirrors, lenses, filters, collimators, absorbing glass, polarizers, polarization rotating elements, prisms, and alignment fiducials; d) an item desired to interact with a source emitting EM radiation or particles, including a workpiece whose material properties (surface and/or bulk) are modified.

particles—subatomic, atomic or molecular particles, in either charged or neutral states.

power source—a device or connection that supplies electric current, or other type of power, to the powered means. The power source may be alternating or direct current at a variety of strengths (voltages). Other sources of power may include hydraulic and pneumatic.

powered means—means to apply a driving force to the driver bar by which the driver bar is moved from a first position to a second position via the use of power.

second position—ending stable position of the driver bar, actuation arm or optical element after the driver bar has been driven by the powered means source—one or more sources of electromagnetic radiation or particles, emitted in all directions or as a beam.

DESCRIPTION

Embodiment One

Figure 1B:
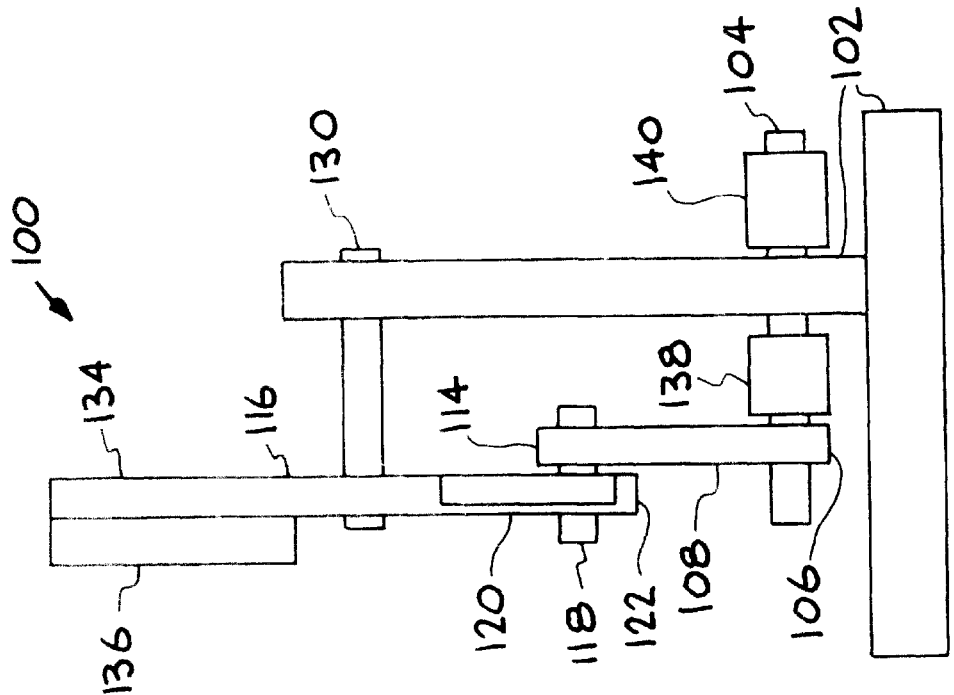
FIGS. 1A and 1B illustrate the front and side views for an embodiment of the present invention wherein the non-powered means and the powered means operate on an output rod connected to the driver bar.
Figure 1A:
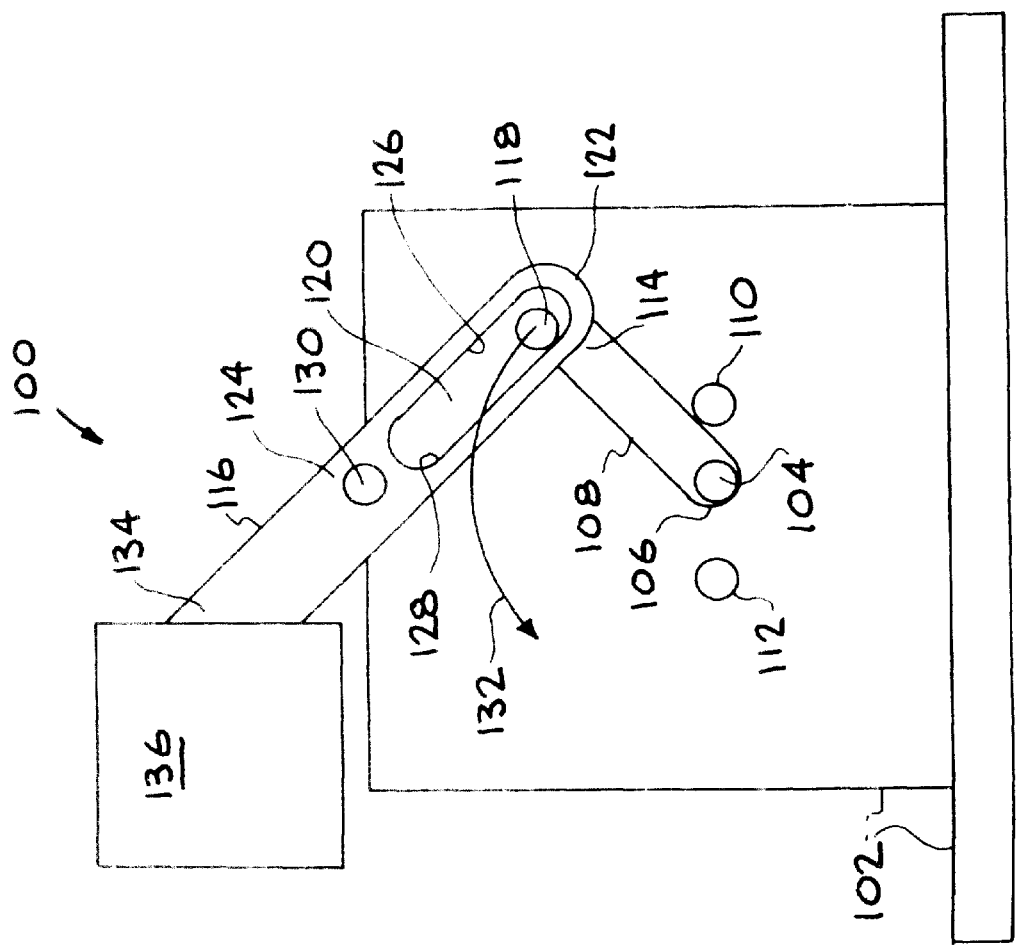

FIGS. 1A and 1B illustrate front and side views for an embodiment of the present invention. A bi-stable optical element actuator device 100 of the present invention comprises a mounting base 102, a driver bar 108 having first and second ends, and an actuation arm 116 having first and second ends. The first end (driven end) 106 of driver bar 108 is connected via output rod 104 to mounting base 102. The second end (working end) 114 of driver bar 108 is mechanically linked to the actuation arm 116, by a bearing 118 that slides within an elongated slot 120 in the first end 122 (driven end) of actuation arm 116.

Powered means 138 applies a torsional driving force to driver bar 108 via output rod 104 to cause driver bar 108 to pivot from a first position to a second position. Powered means 138 is preferably a rotary actuator, but may also include electric motors, electric engines, rotary solenoids and electromagnets. A preferred rotary actuator is part no. RA35A-2P12.9726 manufactured by Shindengen of Japan. Electromagnets may be positioned relative to each other or to ferromagnetic materials, as is well known in the art, so that repulsive (or attractive) magnetic forces are generated.

Non-powered means 140 applies a torsional restraining force to driver 108 via output rod 104 which urges driver bar 108 to remain in either of the driver bar's first or second positions. Non-powered means 140 preferably comprises combinations of permanent magnets aligned with each other or with respect to ferromagnetic materials, so that the magnetic forces urge said driver bar 108 to remain in either of its first or second positions.

Figure 1C:
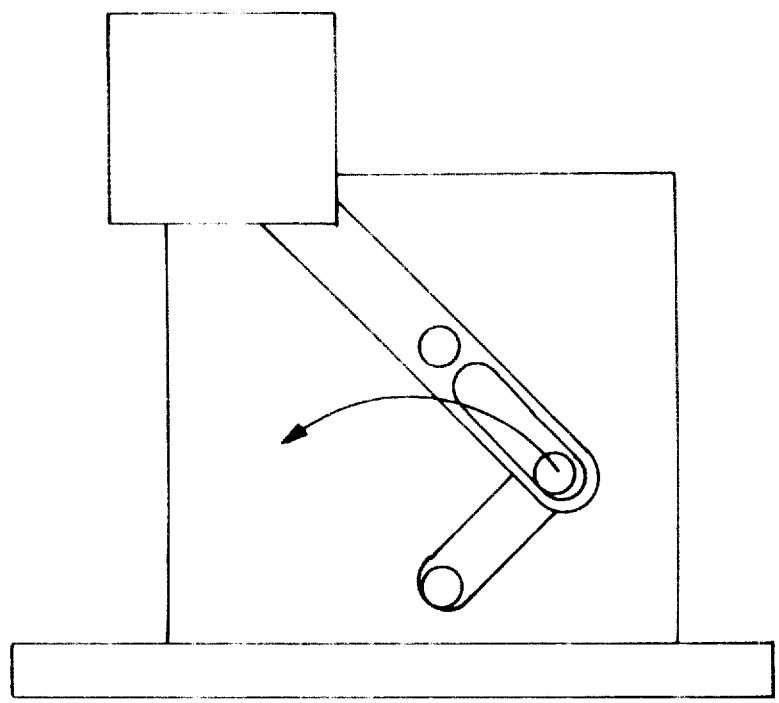
FIGS. 1C and 1D illustrate front views for the two positions for the driver bar for embodiments of the present invention as the driver bar is driven from its first position (1C) to its second position (1D).

As driver bar 108 pivots from the first position shown in FIG. 1C, bearing 118 is forced to slide within elongated slot 120 toward a middle portion 124 of actuation arm 116. As bearing 118 slides within elongated slot 120, bearing 118 exerts a force on either a wall 126 or a wall 128 of slot 120, causing actuation arm 116 to pivot about a pivot 130. As bearing 118 moves from one side to the other of device 100, bearing 118 travels in a path defined by a curved outline 132 shown in FIG. 1A. As driven end 122 of actuation arm 116 is forced to move to the left by bearing 118, the second end 134 of actuation arm 116 moves from the left, the position shown in FIG. 1C, to the right, the position shown in FIG. 1D. Mounted on the actuation arm second end 134 is an optical element 136. As actuation arm second end 134 moves from the position shown in FIG. 1C to the position shown in FIG. 1D, optical element 136 not only moves from left to right in an arc, but also rotates in a clockwise direction. Optical element 136 may be fixed or removably attached to actuation arm second end 134 by means well known in the art.

Figure 1D:
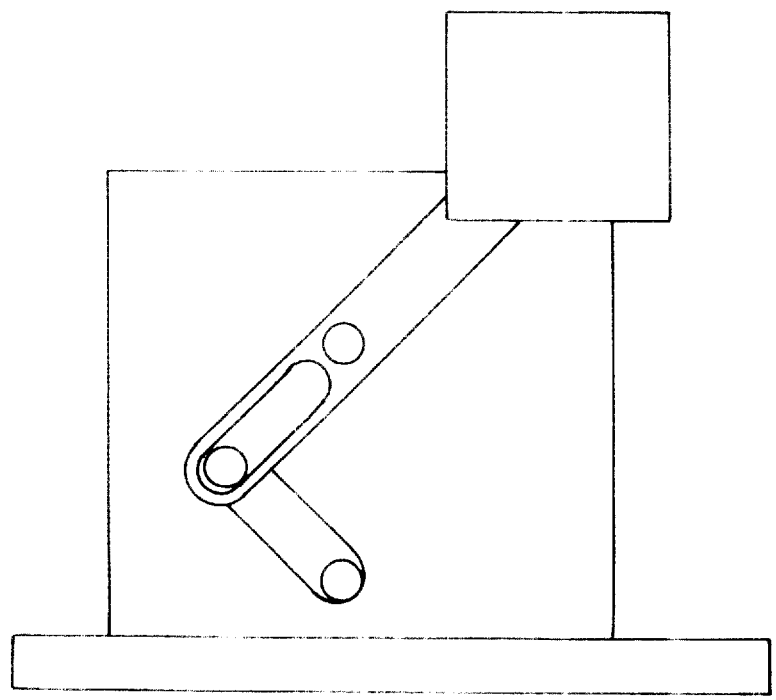

As shown in the embodiment of the present invention shown in FIGS. 1C and 1D, the driver bar and actuation arm are preferably at angle of 90° with respect to each other when the driver bar is in either of its first and second positions. It is further preferred that the distance from the output rod to the bearing on the driver bar (length 1) be equal to the distance from the bearing to the actuation arm pivot (length 2). If length 1 is made shorter than length 2, then the driver bar would need to travel more than 90 degrees to meet the initial zero angular velocity criteria. The optical element would not move as fast nor rotate as much as in the 90 degrees case. Also, as can be seen in FIGS. 1C and 1D, pivoting the driver bar 90° causes the actuation arm to be pivoted 90° in the opposite rotational direction. By arranging the driver bar and actuation arm 90° to one another when the actuation is in the first position, when the driver bar is pivoted, the actuation arm is accelerated by the driver arm and bearing from zero angular velocity at the actuation arm first position, to a maximum angular velocity at 45° of rotation and then decelerated back to zero velocity at 90° of rotation, when the actuation arm reaches the second stationary position. This design locks the actuation arm in either the first or second positions until the actuation arm is pivoted in the reverse direction. It may also be noted that output rod 104 is aligned with pivot 130. The position of driver bar 108 may be detected via first and second position sensors 1 10 and 112 respectively.

Embodiment Two

Figure 2:
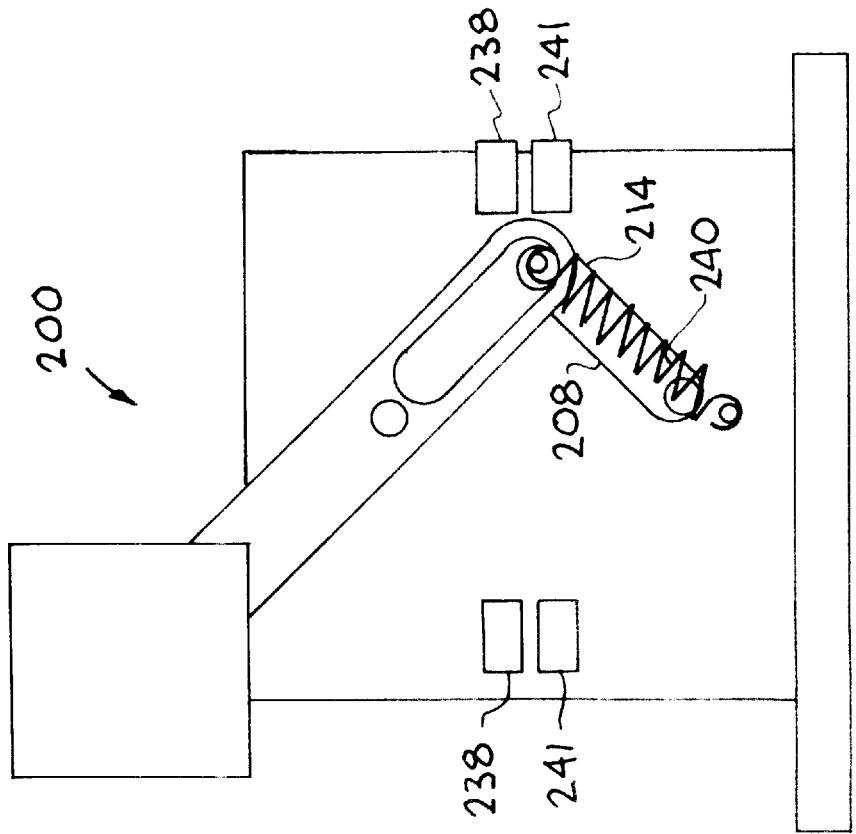
FIG. 2 illustrates the front view for an embodiment of the present invention wherein the non-powered means comprises a spring or a permanent magnet that cooperates with the second end of the driver bar.

FIG. 2 illustrates a front view for a second embodiment of the present invention. Powered means 238 applies a driving force to driver bar 208 at the working end 214 of driver bar 208 to pivot driver bar 208 from a first position to a second position. The power source for powered means 238 may comprise electric, hydraulic or pneumatic. The powered means 238 may comprise solenoids and electromagnets.

Non-powered means applies a restraining force to driver bar 208 at the working end 214 of driver bar 208 which urges driver bar 208 to remain at either of its first or second positions. Non-powered means 240 comprises at least one spring, preferably a helical tension or compression spring. It is understood that the present invention encompasses configurations for the various other types of springs that are well known in the art, including but not limited to helical, Belleville, leaf, extension, volute, and conical springs. Non-powered means 241 may also comprise one or more permanent magnets or a combination of one or more permanent magnets and ferromagnetic materials.

Embodiment Three

Figure 3:
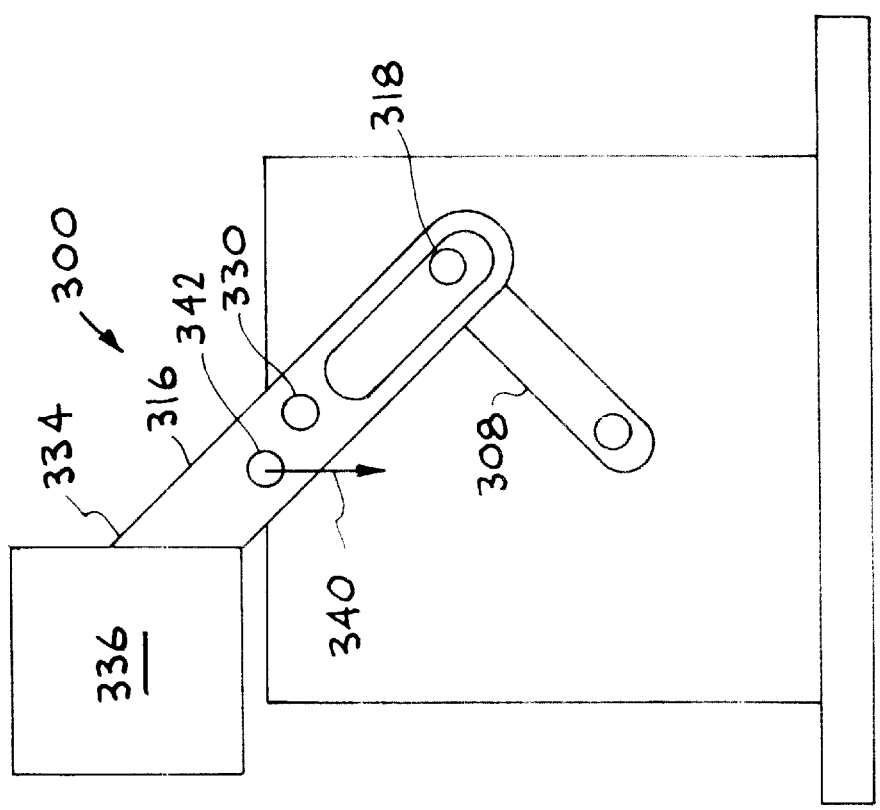
FIG. 3 illustrates the front view for an embodiment of the present invention wherein the non-powered means comprises gravity.

FIG. 3 illustrates the front view for an embodiment of the present invention wherein the non-powered means 340 comprises gravity. Locating the composite center of gravity (CG) 342, for the optical element 336 and actuation arm 316, between pivot 330 and actuation arm second end 334 means that gravity acting on the CG 342 will urge the driver bar 308 to remain in either of driver bar's position one or position two.

Embodiment Four

Figure 4A:
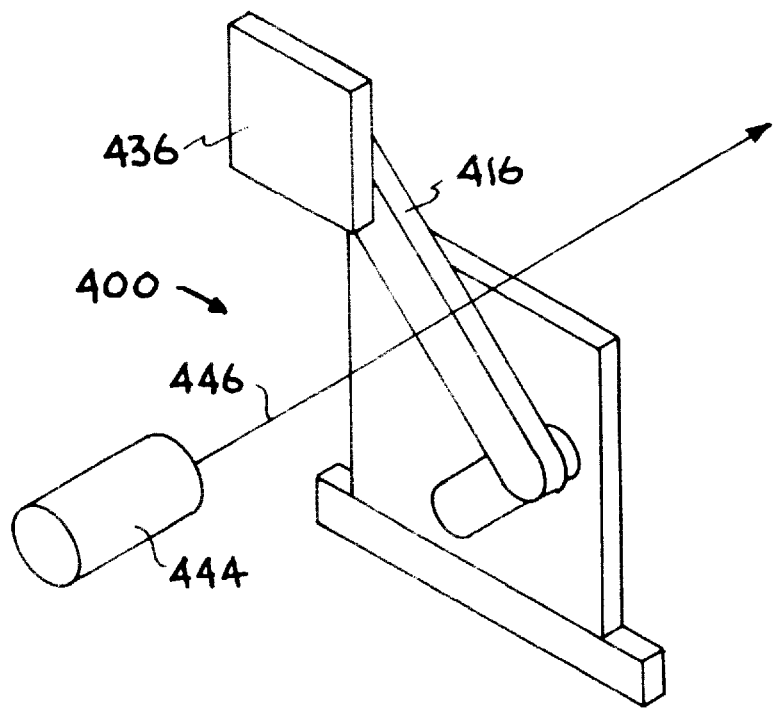
FIGS. 4A and 4B illustrate an aspect of the present invention which further comprises a source (preferably a beam source) emitting a flux of EM radiation or particles.
Figure 4B:
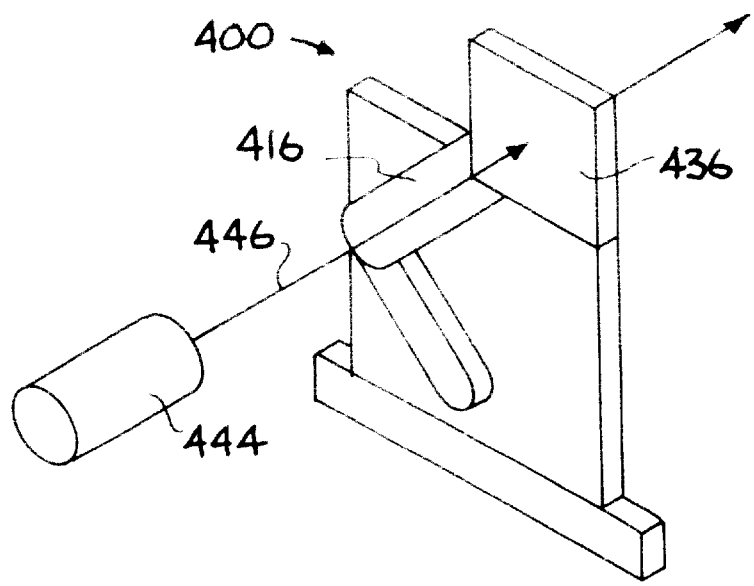

FIGS. 4A and 4B illustrate an aspect of the present invention comprising a bi-stable optical element actuator device 400 cooperating with a source 444 (preferably a beam source) emitting a flux 446 of EM radiation or particles. In FIG. 4A, the optical element 436 is initially not in the path of the flux 446 while the actuation arm 416 is in its first position. As shown in FIG. 4B, the optical element 436 intercepts at least a portion of said emitted flux 446 when the actuation arm 416 is moved to the second position by various powered means (as described earlier). One application (but not limited to) of this embodiment would be as a shutter, wherein the optical element 436 is a shield that moves into the path of the flux 446 partially or completely blocking the transmission of the flux. It is understood that this embodiment also encompasses the configuration wherein the optical element 436 initially intercepts at least a portion of said emitted flux 446 while the actuation arm 416 is in its first position, and subsequently gets moved out of the path of the flux 446 (actuation arm second position). One application (but not limited to) of this embodiment would be as a switch, wherein the optical element 436 is a shield which moves out of the path of the flux 446.

Embodiment Five

Figure 5A:
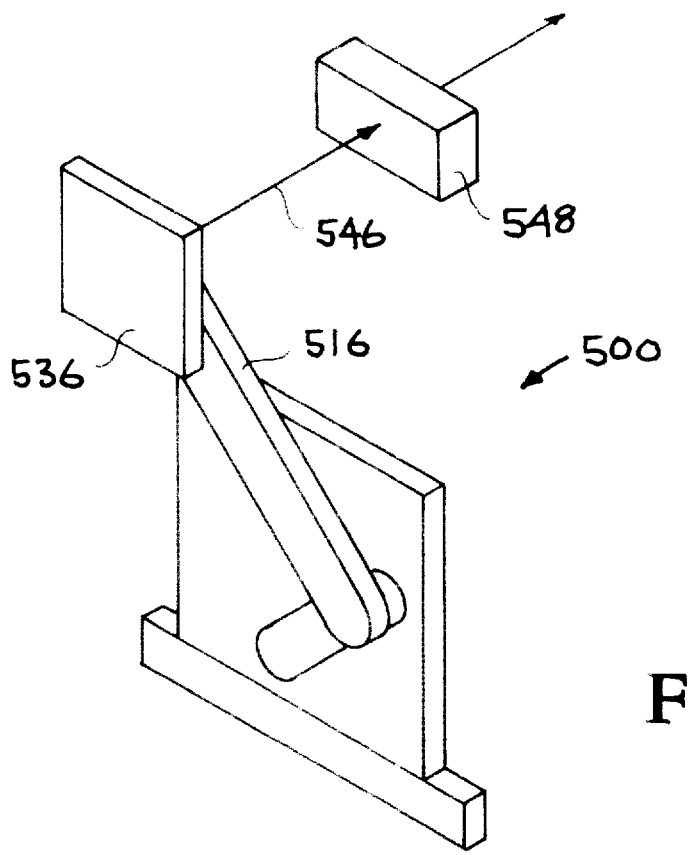
FIGS. 5A and 5B illustrate an aspect of the present invention wherein the optical element comprises a source emitting a flux of EM radiation or particles.
Figure 5B:
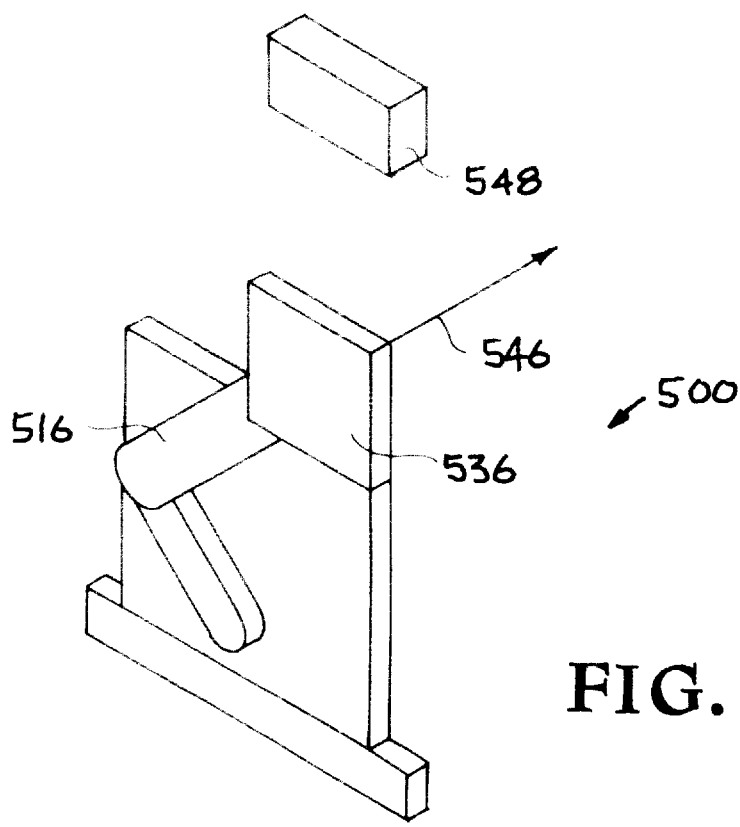

FIGS. 5A and 5B illustrate an aspect of the present invention comprising a bistable optical element actuator device 500 in which optical element 536 comprises a source (preferably a beam source) of EM radiation or particles a portion of whose flux impinges on a second optical element item 548. In FIG. 5A, the second optical element 548 intercepts at least a portion of flux 546 from the optical element 536 while the actuation arm 516 is in its first position. In FIG. 5B, when the actuation arm 516 is moved to the second position by various powered means (as described earlier), the second optical element 548 no longer intercepts the flux 546 from optical element 536. If the source 536 is not a beam source, then additional shielding (not shown) may be needed to shield the second optical element 548 when the actuation arm is moved to position two. Although the embodiment illustrated was for the scenario that the second optical element 548 receives flux when the actuation arm is in the first position, it is understood that the present invention also encompasses the scenario wherein the second optical element 548 receives at least a portion of the flux when the actuation arm is in the second position, and the second optical element 548 receives no flux in the actuation arm First position.

It is understood that since the device is stable in two (first and second) positions, the first and second positions are denoted for illustrative purposes for a given driving force direction. In FIGS. 1C and 1D, the driver bar motion is shown as moving from the right side (first position) to the left (second position). The first position could equally have been set as being on the left side, with the driver bar moving to the right (second position). As described earlier, the first and second positions only signify the initial and ending stable positions, before and after the driver bar has been driven by the powered means. As the driving force direction is reversed, the positions designated as first and second positions are also reversed. It is to be understood that the present invention as described herein may be operated wherein the direction of the driver bar motion is repeatedly reversed (cycled).

In general, the mounting base of the present invention serves as a platform to which the components of the optical actuator device of the present invention are secured. The mounting base may be made of metal, or another sufficiently strong, non-deformable material.

The driver bar of the present invention is a component to which restraining and driving forces are applied. The driver bar may be made of metal, or other strong, non-deformable material.

The actuation arm of the present invention is the portion of the optical actuator device that is driven by the driver bar and pivots in an opposite rotational direction. The actuation arm is preferably made of a strong, non-deformable material, most preferably a machinable, high-strength plastic such as DELRIN.

Obviously numerous modifications and variations of the present invention are possible in the light of the above teachings. It is therefore to be understood that within the scope of the appended claims the invention may be practiced otherwise than as specifically described therein.

What is claimed is:

1. A bi-stable optical actuator device, comprising:
   a mounting base;
   an actuation arm having first and second positions, and having a first end, a second end, and a middle region, said middle region being rotatably connected to said mounting base, said first end including an elongated opening;
   an optical element attached to said actuation arm second end;

a driver bar having first and second positions, and having a first end rotatably connected to said mounting base and a second end;

a bearing mounted on said driver bar second end, for engaging and traveling within said elongated opening, for driving said actuation arm between said actuation arm first and second positions when said driver bar pivots from said driver bar first and second positions. so that when said driver bar pivots in a given direction said actuation arm is driven in an opposite rotational direction by said bearing;

non-powered means for applying a restraining force to said driver bar to hold said driver bar in either of said driver bar first or second positions; and powered means for applying a driving force to said driver bar which causes said driver bar to pivot from said driver bar first position to driver bar second position, wherein said powered means is selected from the group consisting of motors, engines, rotary actuators. electromagnets, combinations of electromagnets and ferromagnetic materials, and electromagnetic solenoids.

2. The device of claim 1, wherein:

said driver bar and actuation arm are at a relative angle of 90 degrees with respect to each other when said actuation arm is in said actuation arm first position; and said non-powered means comprises gravity acting directly on the composite center of gravity of the actuation arm and optical element, which urges said driver bar to remain in either of said driver bar first or second positions.

3. The device of claim 1, wherein:

said non-powered means comprises at least one spring or combination of springs selected from the group consisting of compression, tension, helical, Belleville, extension, volute, conical and leaf springs.

4. The device of claim 1, wherein:

said non-powered means is selected from the group consisting of permanent magnets, and combinations of permanent magnets and ferromagnetic materials.

5. The device of claim 1, wherein:

said optical element is a source emitting, EM radiation or particles.

6. The device of claim 5, wherein:

said source is a beam source.

7. The device of claim 1, wherein:

said optical element is an instrument capable of measuring, sensing or detecting EM radiation or particles.

8. The device of claim 1, wherein:

said optical element is an element capable of reflecting, transmitting or absorbing EM radiation or particles.

9. The device of claim 8, wherein:

said optical clement is selected from the group consisting of shields, mirrors. lenses, filters, collimators, absorbing glass, polarizers, polarization rotating elements, prisms, and alignment fiducials.

10. The device of claim 1, further comprising:

a source emitting EM radiation or particles; and wherein at least a portion of said source's emission is intercepted by said optical element in said actuation arm first position, and said source's emission is not intercepted by said optical clement in said actuation arm second position.

11. The device of claim 10, wherein:

said source is a beam source.

12. The device of claim 1, further comprising:

a source emitting EM radiation or particles;

and wherein at least a portion of said source's emission is intercepted by said optical clement in said actuation arm second position, and said source's emission is not intercepted by said optical element in said actuation arm first position.

13. The device of claim 12, wherein:

said source is a beam source.

14. The device of claim 1 further comprising:

a second optical element;

wherein said first optical clement is a source emitting EM radiation or particles; and wherein said second optical clement intercepts at least a portion of said source emission in said actuation arm first position, and said second optical element does not intercept said source emission in said actuation arm second position.

15. The device of claim 14 wherein:

said source is a beam source.

16. The device of claim 1 further comprising:

a second optical element;

wherein said first optical element is a source emitting EM radiation or particles; and wherein said second optical element does not intercept said source emission in said actuation arm first position, and said second optical element intercepts at least a portion of said source emission in said actuation arm second position.

17. The device of claim 16 wherein:

said source is a beam source.

18. The device of claim 1 further comprising:

at least one position sensor positioned relative to said driver bar to detect when said driver bar is in said driver bar first and second positions.

19. The device of claim 1 wherein:

the driving force is a torsional force applied to said driver bar rotatable connection.

20. The device of claim 1 wherein:

the driving force is applied to said driver bar second end.

21. The device of claim 1 wherein:

the restraining force is a torsional force applied to said driver bar rotatable connection.

22. The device of claim 1 wherein:

the restraining force is applied to said driver bar second end.

* * * * *